United States Patent [19]

Strella et al.

[11] 4,185,140

[45] Jan. 22, 1980

[54] POLYMERIC RELEASE AGENTS FOR ELECTROSCOPIC THERMOPLASTIC TONERS

[75] Inventors: Stephen Strella; Donald A. Seanor, both of Pittsford; George R. Imperial; Thomas R. Hoffend, both of Webster, all of N.Y.

[73] Assignee: Xerox Corporation, Stamford, Conn.

[21] Appl. No.: 897,623

[22] Filed: Apr. 19, 1978

Related U.S. Application Data

[62] Division of Ser. No. 491,415, Jul. 24, 1974, Pat. No. 4,101,686.

[51] Int. Cl.[2] ...................... B32B 15/08; G03G 13/20

[52] U.S. Cl. .................................... 428/418; 427/375; 427/359; 427/387; 427/388 R; 428/411; 428/423; 428/447; 428/450

[58] Field of Search ................... 427/22, 23, 375, 345, 427/366, 359, 387, 388 D; 428/411, 418, 423, 447, 457, 450

[56] References Cited

U.S. PATENT DOCUMENTS

| | | | |
|---|---|---|---|
| 3,346,405 | 10/1967 | Viventi | 106/14 |
| 3,937,637 | 2/1976 | Moser et al. | 148/6 |
| 3,938,993 | 2/1976 | Royka et al. | 427/22 |
| 4,011,362 | 3/1977 | Stewart | 428/447 |
| 4,029,827 | 6/1977 | Imperial et al. | 427/22 |

*Primary Examiner*—Harold Ansher
*Attorney, Agent, or Firm*—Ernest F. Chapman

[57] ABSTRACT

Polymeric release agents having functional groups such as carboxy, hydroxy, epoxy, amino, isocyanate, thioether or mercapto groups are applied to a heated fuser member in an electrostatic reproducing apparatus to form thereon a thermally stable, renewable, self-cleaning layer having excellent toner release properties for conventional electroscopic thermoplastic resin toners. The functional polymeric fluids interact with the fuser member in such a manner as to form a thin, thermally stable interfacial barrier at the surface of the fuser member while leaving an outer film or layer of unreacted release fluid. The interfacial barrier is strongly attached to the fuser member surface and prevents electroscopic thermoplastic resin toner material from contacting the outer surface of the fuser member. The material on the surface of the fuser member is of minimal thickness and thereby represents a minimal thermal barrier.

27 Claims, 2 Drawing Figures

POLYMERIC RELEASE AGENTS FOR ELECTROSCOPIC THERMOPLASTIC TONERS

This is a division, of application Ser. No. 491,415, filed July 24, 1974, now U.S. Pat. No. 4,101,686.

BACKGROUND OF THE INVENTION

This invention relates generally to xerographic copying methods and apparatus, and, more particularly, it relates to the fixing of particulate thermoplastic toner by direct contact with the surface of a fusing member having a novel fluid release surface.

In the process of xerography, a light image of an original to be copied is typically recorded in the form of a latent electrostatic image upon a photosensitive member with subsequent rendering of the latent image visible by the application of electroscopic marking particles, commonly referred to as toner. The visual toner image can be either fixed directly upon the photosensitive member or transferred from the member to another support, such as a sheet of plain paper, with subsequent affixing of the image thereto.

In order to affix or fuse electroscopic toner material onto a support member permanently by heat, it is necessary to elevate the temperature of the toner material to a point at which the constituents of the toner material coalesce and become tacky. This action causes the toner to flow to some extent into the fibers or pores of support members or otherwise upon the surfaces thereof. Thereafter, as the toner material cools, solidification of the toner material occurs causing the toner material to be bonded firmly to the support member. In both the xerographic as well as the electrographic recording arts, the use of thermal energy for fixing toner images onto a support member is old and well known.

One approach to thermal fusing of electroscopic toner images onto a support has been to pass the support with the toner images thereon between a pair of opposed roller members, at least one of which is internally heated. During operation of a fusing system of this type, the support member to which the toner images are electrostatically adhered is moved through the nip formed between the rolls with the toner image contacting the fuser roll thereby to affect heating of the toner images within the nip. By controlling the heat transferred to the toner, virtually no offset of the toner particles from the copy sheet to the fuser roll is experienced under normal conditions. This is because the heat applied to the surface of the roller is insufficient to raise the temperature of the surface of the roller above the "hot offset" temperature of the toner at which temperature the toner particles in the image areas of the toner liquify and cause a splitting action in the molten toner resulting in "hot offset." Splitting occurs when the cohesive forces holding the viscous toner mass together is less than the adhesive forces tending to offset it to a contacting surface such as a fuser roll.

Occasionally, however, toner particles will be offset to the fuser roll by an insufficient application of heat to the surface thereof (i.e. "cold" offsetting); by imperfections in the properties of the surface of the roll; or by the toner particles insufficiently adhering to the copy sheet by the electrostatic forces which normally hold them there. In such a case, toner particles may be transferred to the surface of the fuser roll with subsequent transfer to the backup roll during periods of time when no copy paper is in the nip.

Moreover, toner particles can be picked up by the fuser and/or backup roll during fusing of duplex copies or simply from the surroundings of the reproducing apparatus.

One arrangement for minimizing the foregoing problems, particularly that which is commonly referred to as "offsetting," has been to provide a fuser roll with an outer surface or covering of polytetrafluoroethylene, known by the trade name, Teflon, to which a release agent such as silicone oil is applied, the thickness of the Teflon being on the order of several mils and the thickness of the oil being less than 1 micron. Silicone based oils, (polydimethylsiloxane), which possess a relatively low surface energy, have been found to be materials that are suitable for use in the heated fuser roll environment where Teflon constitutes the outer surface of the fuser roll. In practice, a thin layer of silicone oil is applied to the surface of the heated roll to form an interface between the roll surface and the toner images carried on the support material. Thus, a low surface energy layer is presented to the toner as it passes through the fuser nip and thereby prevents toner from offsetting to the fuser roll surface.

A fuser roll construction of the type described above is fabricated by applying in any suitable manner a solid layer of abhesive material to a rigid core or substrate, such as the solid Teflon outer surface or covering of the aforementioned arrangement. The resulting roll structure is subject to wear and degradation due to continued operation at elevated temperatures and also to damage from accidental gouging by stripper fingers conventionally employed in such systems. The foregoing in many instances necessitates replacement of the fuser roll which is quite costly when a large number of machines are involved.

Moreover, the polytetrafluoroethylene along with the coating of silicone oil is of sufficient thickness to constitute a poor thermal conductor, and longer nip dwell and higher fuser roll temperatures are required to deliver the fusing energy required to fix toner. Also, control of the surface temperature of the roll presents a problem due to large temperature variations occuring before and after contacting of the substrate carrying the images.

In view of the foregoing it would appear that the high thermal conductivity and wear resistance of bare metals or similar materials would be desirable for utilization in fuser roll structures, however, such materials have, heretofore, not been found satisfactory for such application. The latter is attributed to the very high surface energy of metals and similar materials which renders them readily wettable by hot toner materials. Once wetted by hot toner, it has been very difficult if not impossible to remove the toner completely from such materials while they remain hot. Commonly used release agents such as pure silicone oils and mineral oils have been tried in combination with various metals and other high surface energy materials but with relatively little or no success.

It is also reported in U.S. Pat. No. 3,810,776 that offset of toner to a heated fusing roll is prevented by coating the fusing roll with an adhesion preventing layer of an immiscible dispersion of a high viscosity, low surface tension component such as zinc or aluminum stearate or behenate and low viscosity, low surface tension component such as silicone oil. However, at least dual component systems having immiscible ingredients must be applied and/or mixed in order to prevent hot offset. This in turn leads to additional preparation, handling and application problems.

OBJECTS OF THE INVENTION

Accordingly, it is the principal object of this invention to provide a new and improved release agent, fusing process and device for use in fixing toner images.

Another object of this invention is to provide, for use in a photocopying apparatus and process, a fusing process, device and release agent wherein the fuser member is self-repairing and therefore has a continuously renewable surface.

Another object of this invention is to provide a fusing process and device wherein toner is displaced from the exposed surface of the fuser member by the action of a single component or multiple miscible component release agent on the surface of the fuser member.

Yet another object of the invention is to provide a fusing process and device employing a release agent wherein the release agent is a solid or liquid at room temperature and a liquid during fusing of the toner images to a substrate.

Another object of this invention is to provide, in an electrophotographic apparatus, a roll fusing device and process wherein the roll members of the device need not be separated during standby periods of operation.

Still another object of this invention is to provide a fusing process, device and release agent wherein an interfacial barrier is formed intermediate the fuser member surface and a release layer applied thereto, said layers being provided from a single component system or a multiple misicible ingredient system whereby toner is prevented from contacting the fuser member surface.

Another object of this invention is to provide a fusing device and process for toner images wherein a barrier is formed during operation of the fuser at the interface of the fuser roll surface and a release agent through interaction between the release agent and the fuser roll material.

Still another object of this invention is to provide a new and improved release agent, device and method for fusing toner images to a substrate wherein toner barrier and toner release coatings are formed on a thermally conductive core and wherein the combined thickness of the coatings is insufficient to establish an appreciable thermal barrier to the energy being conducted through the core, thereby lowering the power requirements for maintaining a heated core and for the overall fusing operation.

Other objects and advantages of the present invention will become apparent when read in conjunction with the accompanying drawings and specification.

SUMMARY OF THE INVENTION

The above-cited objects of the present invention are accomplished by applying a polymeric fluid having functional groups to a heated fuser member in an electrostatic reproducing apparatus. The functional groups of the polymeric fluid must be capable of interacting with the fuser member surface to form a thermally-stable barrier to toner, said barrier designated herein as an interfacial layer, which strongly adheres to the metal, glass or other substrate of the fuser member and provides a thin coating which has excellent release properties for the toners used in electrostatic printing. The functional groups are generally known as chemically reactive groups. Preferred chemically reactive functional groups which are a part of the non-volatile polymeric material, include carboxy, hydroxy, epoxy, amino, isocyanate, thioether, mercapto and the like and combinations thereof. The fluid may be applied to the surface of the fuser member in thicknesses ranging from submicron to several microns to constitute a minimal barrier to heat transfer. By employing the polymeric fluid release agent and process of this invention there is provided a fuser member having in essence a bare surface surrounded only by a minute layer of material which prevents toner from contacting the surface.

While the mechanism is not completely understood, it has been observed that when this class of functional fluids is applied to the surface of a fuser device, there is an interaction (a chemical reaction, coordination complex, hydrogen bonding or other mechanism) between the metal or glass surface of the fuser and the polymeric fluids having functional groups, so that an interfacial barrier layer comprising the reaction product between the metal, glass or other material of the fuser member and the functional polymeric fluid forms a barrier layer intermediate the metal or glass or other substrate of the fuser member and the outer layer of polymeric fluid coating the fuser member. This outer layer may be referred to as the non-reacted release layer, or generally, the release layer. The coating, however formed, has been observed to have a greater affinity for the fuser substrate material than the toner and thereby prevents non-functional or non-reactive electroscopic thermoplastic resin toners from contacting the core, while the release coating provides a material the cohesive force of which is less than the adhesive forces between the heated toner and the substrate to which it is applied, and the cohesive forces of the toner. Not only do these coatings have excellent release properties, but it has also been observed that the thermally-stable layer is continuously renewable and self-repairing. That is to say, if this coating is damaged, for example, by uneven pressures exerted by the blade utilized for metering the release material to the core, or by undue forces exerted by the finger employed for stripping the substrate from the fuser roll structure, the thermally-stable coating will repair itself.

It was also observed unexpectedly that non-functional or non-reactive toner of the type commonly used in electrostatic printing is displaced from damaged or worn areas which interrupt the coating on the heated fuser member when polymeric fluids having chemically reactive functional groups as above described, are used in accordance with the present invention. The softened or tacky toner is substantially removed by the fluids having the chemically reactive functional groups, and the fluids repair the interrupted, damaged or worn area. This mechanism has substantially reduced offset problems common to the devices and processes of the prior art.

By using the term polymeric fluid in describing the coating materials or release fluids of this invention is meant the state which the polymeric material assumes at operating temperatures. Thus, the polymeric material having the chemically reactive functional groups may be a solid or a liquid at ambient temperature and a fluid at operating temperatures. By using the term "polymeric" is meant two or more monomer units as a backbone having chemically reactive functional groups attached thereto capable of interacting with the fuser member to form a barrier to toner and having a surface energy less than the surface energy of the toner at operating temperatures.

In the process of the present invention it is critical that the polymer fluid contain chemically reactive functional groups which interact with the fuser member surface to form a thermally stable interfacial barrier to toner. It is also critical that the polymeric fluid displace non-reactive electroscopic resin toner when it is coated upon the fuser member to prevent the toner from adhering to the surface of the fuser member or to the fluid layer itself. By use of the phrase "capable of displacing electroscopic thermoplastic resin toner" as used herein, is meant that the polymeric fluid is operable in preventing the toner from contacting the surface of the fuser member and is more reactive than the toner with the material of the fuser member surface to the extent that it repels or displaces the toner from the surface of the fuser member even when the surface thereof is exposed to or contacts the toner.

DESCRIPTION OF THE PREFERRED EMBODIMENTS

Figure 1:
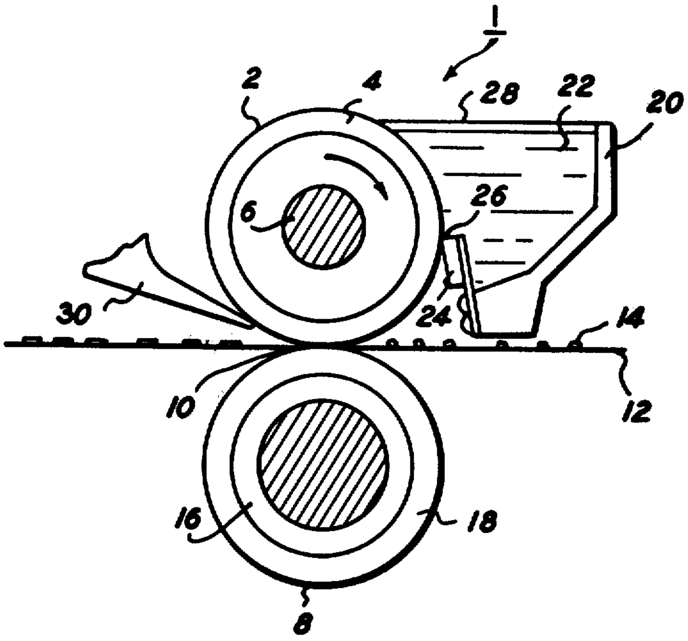
FIG. 1 is a typical side elevational view of a fuser system for a xerographic reproducing apparatus.

The polymeric fluids capable of displacing non-functional electroscopic thermoplastic resin toner are operable in accordance with the present invention only when the appropriate functionality is present in the fluid. The polymeric fluid, which also must have a suitable release function for the non-reactive electroscopic thermoplastic resin toner, must also be capable of forming an interfacial barrier between the metal, glass or other material of the fuser member and the outer layer of the same fluid release material. In accordance with the present invention, this characteristic is found in polymeric fluids which contain, for example, such chemically reactive functional groups as carboxy, hydroxy, epoxy, amino, isocyanate, thioether, mercapto and the like, and combinations thereof.

The present invention encompasses polymeric fluids which are characterized by the above-described properties and which have the necessary built-in functionality. By use of the term "built-in" functionality, is meant any material which is characterized by chemically reactive functional groups such as, for example, carboxy, hydroxy, epoxy, amino, isocyanate, thioether, mercapto and the like, which interact with the surface of the fuser member material. Such compounds or materials having the functionality are generally organic, but in certain cases compounds generally designated as inorganic materials may also be included in the class of materials which are operable in accordance with the teachings of the present invention. Organosiloxane polymers, generally designated as inorganic polymers because of siloxane backbone structure comprising alternate silicon and oxygen atoms in the backbone, belong to that class of polymeric fluids which are operable in accordance with the present invention, as long as they contain the chemically reactive functional groups capable of interacting with the fuser member surface to form a thermally stable interfacial barrier. The polysiloxane chain itself $(SiOSi—O—)_n$ is typically inorganic in nature, and because of this polysiloxane chain it is characteristically thermally and chemically stable. However, it may also be considered organic in nature because of the hydrocarbon content of the polymers. Thus, polymeric fluids capable of displacing non-functional electroscopic thermoplastic resin toner and containing chemically reactive functional groups encompasses those organosiloxane polymers which have functional groups and which are characterized by the above-described properties. The organic substituted polysiloxane derivatives, for example, the alkyl-substituted polyorganosiloxanes, having the appropriate built-in chemically reactive functionality have been found particularly useful in accordance with the present invention.

A typical polysiloxane is of the dialkyl type having the general formula:

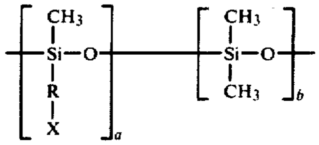

wherein R represents a "spacer" group pendant from the polymer backbone and X represents a functional group. In preferred embodiments R is an alkyl moiety having about 1-8 carbon atoms, typically a propyl group ($—CH_2—CH_2—CH_2—$). For a typical polymer having a one mole percent functional content, there is 1 a moiety for every 99 *b*'s. If the functional group content is 2 mole perent, there is an average of 2 a moieties for every 98 *b* moieties. The R spacer groups may all be similar, for example, methyl, ethyl or propyl, or they may be mixtures of alkyl groups, for example, mixtures of propyl and butyl, or ethyl and propyl, and the like. In addition, the R spacer group may be a straight chain, or it may be branched. The typical molecule shown in the general formula above comprises methyl groups substituted on the Si atoms in non-spacer group sites. However, these non-spacer group sites may typically comprise general alkyl groups from about 1 to 6 carbons and mixtures thereof. Other groups may be substituted at these sites by one skilled in the art as long as the substituted groups do not interfere with the functional groups designated in the general formula by X. The -R-X groups may be randomly positioned in the molecule to provide the functional groups critical in the release agents, processes and devices of the present invention. X, which represents the critical functional groups, is typically carboxy, hydroxy, epoxy, amino, mercapto, isocyanate or thioether. Alternatively or in addition, the functional groups (X) may be located on spacerdgroups (R) at terminal sites on the molecule, i.e., the molecule may be "end-capped" by the functional groups.

Other fluids which have been found operable in accordance with the present invention include those polymers which are fluid at operating temperatures and which have the designated built-in functionality. For example, polyethylene polymers having any of the above-described built-in functional groups, polypropylene having any of the above-described built-in functional groups, polyisobutylene having any of the above-described built-in functional groups, and the like, may be used in accordance with the present invention. Other examples of organic polymers which may be used in accordance with the present invention are the vinyl polymers having functional groups, for example, polystyrene with carboxylic groups, polystyrene with amino groups, polystyrene with hydroxyl groups, and the like. Other homopolymers and copolymers may also be used, for example, copolymers of ethylene and acrylic acid, ethylene and methacrylic acid, propylene and acrylic acid, propylene and methacrylic acid, isobutylene and acrylic acid, isobutylene and methacrylic acid, ethylene and acrylamide, ethylene and methacrylamide and homopolymers and copolymers of 2-cyanoethyl acrylate.

Other polymeric fluids having chemically reactive functional groups which may be used in accordance with the present invention, are those materials which have the above-described characteristics when metered or coated upon a fuser member surface, examples of which are functional group substituted biphenyls and functional group substituted polyphenyl ethers, for example, functional groups such as carboxy, hydroxy, epoxy, amino, isocyanate, thioether and mercapto.

In order to provide suitable release of thermoplastic toner with improved offset when bare fuser rolls are used in the process and device of the present invention, the release agents having chemically reactive functional groups must have the following properties either before, during, or after application to the fuser member surface. The polymeric release agents are preferably non-volatile, that is, they must not produce excessive levels of volatile fumes and vapors which penetrate the surrounding atmosphere and thereby cause deposits upon surrounding parts in the copying apparatus or fumes which are toxic, in the environment. The release material upon the fuser member must be thermally stable, that is, the fluid must not form a gel or decompose at operating temperatures over reasonable periods of time, for example, at least about 200 hours at operating temperature. This is dependent upon the particular machine and machine use. The fluid having functional groups is preferably non-corrosive to the machine parts and to the paper, and it must be non-reactive, that is, inert, to the toner used in the development of the electrostatic latent image. The polymeric fluid must produce a low energy surface to the toner which is undergoing fusing by heat, that is, it must be abhesive and the surface energy must be less than the surface energy of the molten or heated toner. For example, a conventional toner has a room temperature surface energy of about 28–36 dynes/cm., and the fluid must have a surface energy less than that of the toner. The interfacial layer is preferably impenetrable to the toner, that is, the electroscopic thermoplastic resin toner applied to the fuser member and softened must not be able to penetrate the intact interfacial barrier layer so that the fuser member surface will be exposed to toner particles which may become entrapped within the layers upon the member. The fluids must be capable of application to the fuser member in minute thicknesses preferably of the order of magnitude of 10 microns or less so that only a minimum thermal barrier will be coated upon the bare fuser member. It is also preferred that any interfacial layer which forms a barrier between the fuser member surface and the outer release layer remain insoluble in the non-volatile fluid release layer even at the operating temperatures of the device. The viscosity of the polymeric fluids is preferably higher than about 10 centipoise at 300° F.

Generally, the modes in which the release agents of the present invention are utilized are those wherein the coating can be continuously applied to the surface of the fuser member, and accordingly, the coating is deemed self-renewing in these cases. The polymeric fluid having functional groups therein may be applied to the fuser member by any of the standard or conventional methods or devices known to those skilled in the art, and include application by brushes, by spraying, by metering from a sump, by application from a wiper blade or wiper comprising the polymeric fluid having the functional groups therein, by applying from a suitable sump, by applying from a wick, by padding, and the like. In general, one skilled in the art will be able to use this invention in the fuser assembly of a copying device wherein thermoplastic resin toner applied to a substrate in image configuration must be heated or fused in order to fix permanently the colored substance in image configuration upon the substrate. The polymeric release material may also be applied in the form of a solid which becomes fluid at operating temperatures, for example, a block of the polymer having suitable functional groups may rub against the heated fuser member to apply a film of the polymer on the fuser member. The polymeric release agent may also be applied in conjunction with a cutting or dilution agent with which it is miscible, that is, as two or more miscible components. An example of this embodiment is a mixture of the polydimethylsiloxane having functional carboxy groups attached to a propyl spacer group mixed with the polydimethylsiloxane (silicone oil) with which it is miscible and which acts as a dilution agent. The release agents of the present invention may also be applied as a single component to provide both the interfacial barrier and the release surface.

In applying the polymeric fluid capable of displacing electroscopic thermoplastic resin toner, to the surface of the fuser member, the polymer fluid containing chemically reactive functional groups capable of interacting with the fuser member surface to form a thermally stable interfacial barrier to the toner, the fluid must be applied in an amount sufficient to cover the surface with at least a continuous low surface energy film in order to provide the fuser member with a surface which not only releases thermoplastic resin toner heated by the fuser member but also with an amount which will prevent the thermoplastic resin toner from contacting the surface of the fuser member. Generally, in accordance with the objects of the present invention, the amount sufficient to cover the surface must be that amount which will maintain a thickness of the fluid in a range of submicron to microns and is preferably from about 0.5 micron to about 10 microns in thickness. Thus, in essence, the layer of the polymeric fluid on the surface of the fuser member is so slight that there is essentially a bare fuser member. Although this layer or coating of the polymeric fluid having chemically reactive functional groups, may be applied to the fuser member surface intermittently, it is generally preferred to apply the fluid continuously on the heated fuser member to maintain thereon a coating of the polymeric fluid and the product or products formed by interaction with the material of the fuser member. During operating of any automatic electrostatic reproducing apparatus, it is generally preferred to continuously apply the fluid on the heated fuser member in order to replace that fluid which is retained by the substrate when the substrate is the type which absorbs the fluid or to which the fluid may adhere, generally in an amount which is measured in fractions of a microliter for each copy. However, in embodiments where there is little or no loss of the polymeric fluid having chemically reactive functional groups, from the surface of the fuser member, continuous application of the fluid may not be necessary, and it may be preferred to utilize application techniques which only apply fluid intermittently to the surface.

In order to be operable in accordance with the present invention, the polymeric fluids having chemically reactive functional groups which are applied to the fuser member and capable of displacing electroscopic thermoplastic resin toner, must not be curable to the extent that they form a solid or gel at operating temperatures at reasonable periods of time as discussed supra. The reasonable time is dependent upon the copier volume, and a reasonable period of time for a high volume copier is at least about 200 hours whereas a reasonable time for a low volume copier is preferably longer than 200 hours and may be 1,000 to 2,000 hours or longer. Thus, if the polymeric fluids applied to the fuser member are of the type which rapidly form solids or gels at the temperatures at which the apparatus operates generally from about 250°-400° F., they are not suitable for use in accordance with the present invention. Furthermore, the polymeric fluids having chemically reactive functional groups must provide a fluid layer at operating temperatures upon the surface of the fuser assembly, and those species which rapidly form a solid or gel as by crosslinking and the like, cannot be used in accordance with the present invention.

In general, the method of the present invention applies to fusing electroscopic thermoplastic resin toner images to a substrate and includes the steps of forming a coating or layer on a heated fuser member of an electrostatic reproducing apparatus, said coating being a barrier to electroscopic thermoplastic resin toner and comprising the product resulting from the interaction of the fuser member and a polymeric fluid having chemically reactive functional groups thereon, said polymer being fluid at the temperatures of the fuser member and acting as a release coating for the electroscopic thermoplastic resin toner. The toner image on the substrate is contacted with the heated fuser member for a period of time sufficient to soften the electroscopic thermoplastic resin toner, and then the softened toner is allowed to cool. The toner barrier coating and the fluid toner release coating are preferably on the order of about 0.5 micron in thickness. The thickness of the barrier coating and release layer are limited only to the extent that such barrier coating and release layer do not prevent heat transfer from the inner core of the fuser member to the thermoplastic resin toner undergoing fusing upon a substrate, and to the extent that there is a sufficient film of the release material on the surface of the fuser member to prevent hot offsetting on the heated fuser member, that is, to prevent the retention of the tackified or molten thermoplastic resin toner by the surface of the heated fuser member so that the retained toner will not transfer to the next substrate contacting the heated fuser member.

The electroscopic thermoplastic resin toner that forms the toner images, for example, numeral 14 in FIG. 1, is comprised of a thermoplastic resin in addition to colorant such as dyes and/or pigments. In accordance with the present invention, these toners are of the type which are non-reactive, that is, they do not have functional groups thereon which are capable of interacting with the fuser member material. Examples of conventional pigments are carbon black and furnace black. The developer material may also contain cleaning materials and plasticizers in accordance with the desired formulation. Typical toners may be chosen by one skilled in the art. For example, a copolymerized mixture of styrene or a blend of sytrene monologs with 10–40 percent (by weight) of one or more methacrylate esters selected from the group consisting of ethyl, propyl and butyl methacrylates as described in U.S. Pat. No. 3,079,342 may be used, said reference being incorporated herein by reference. Typical toner materials include gum copal, gum sandarac, rosin, asphaltum, pilsonite, phenol formaldehyde resins, rosin-modified pehnol formaldehyde resins, methacrylic resins, polystyrene resins, polypropylene resins, epoxy resins, polyethylene resins and mixtures thereof. Among other patents describing non-reactive thermoplastic electroscopic toner compositions are U.S. Pat. No. 2,659,670 to Copley; U.S. Pat. No. 2,754,408 to Landrigan; U.S. Pat. No. 3,079,342 to Insalaco; U.S. Pat. No. Reissue 25, 136 to Carlson and U.S. Pat. No. 2,788,288 to Rheinfrank et al.

For organofunctional silicones, the concentration or amount of functional groups present in the polymeric release fluid containing chemically reactive functional groups to displace electroscopic thermoplastic resin toner is generally preferred in a concentration of 2.0 or less functional groups per molecule. Higher functionality may be present in these and other polymeric fluids containing chemically reactive groups, depending upon the mode of application of the fluid, for example, polymeric fluid containg up to 10 functional groups or higher per molecule may be operable. As explained supra, the polymers may be diluted or cut by the addition of miscible, non-functional materials before or during application to the fuser member. Although concentrations of functional groups in the polymeric fluids greater than 10 mole percent may be utilized in accordance with the present invention, there generally is no advantage in utilizing concentrations higher than 10 mole percent. Functional groups in concentrations as low as even about 0.2 functional groups per molecule have produced suitable results. To treat the surface of a heated fuser member in an electrostatic reproducing apparatus by applying at least one polymeric fluid containing chemically reactive functional groups, one skilled in the art can adjust the concentration of the functionality of the polymeric fluids to provide optimum release and fusing latitude. A suitable or optimum concentration of functional groups of the polymeric fluid can be determined by carrying out a simple test. The test must be conducted upon the same base metal which will be utilized in the fuser member surface since the fusing latitude and release properties of the polymeric fluid vary with the composition of the fuser member. Concentrations of the functional groups on the polymeric fluids may be adjusted to provide optimum fusing latitude and release in accordance with the speed at which the thermoplastic resin toner is to be fused. The test may be carried out on a small heated roll fixture having the desired metal, glass or other suitable surface with a suitable backup or pressure roll. Speed and nip pressure may be adjusted as desired, and the test material may be metered onto the fuser roll member by a suitable device, for example, a metering device such as a blade from a sump system. Temperature can be controlled and the surface temperature on the fuser roll can be determined by a suitable thermocouple. The minimum fuser temperature and the hot offset temperature can be observed for the particular polymeric fluid containing a measured quantity or concentration of chemically reactive functional groups. Unfused thermoplastic resin toner on a substrate can then be fed into the fuser member nip and the latitude test and release characteristics including thermal stability of the material can be determined. Various metals can be tested merely by changing the fuser roll member in the test device, and various polymeric release agents (the concentration, amount or location of chemically reactive functional groups as well as the particular functional group) can be determined by changing the solid or fluid material in the sump or by changing the solid or fluid material having chemically reactive functional groups in any other type of applicator device.

The surface to which the polymeric material (which may be a solid but which must be fluid at operating temperatures) is applied, must be heated to insure proper formation of the interfacial layer which is the result of interaction between the polymeric fluid containing chemically reactive functional groups and the surface of the fuser member. Thus, the interfacial layer becomes heated and remains as a barrier layer upon the surface of the fuser member. Generally, the unreacted or virgin release fluid as it is applied to the fuser member, is heated to the temperature of the fuser roll, however, the release fluid may be somewhat cooler than the roll during operation of the device when heat transfer takes place, that is, when heat is transferred from the fuser member to the substrate containing thermoplastic resin toner undergoing the fusing process. The temperature may be adjusted by one skilled in the art in accordance with the particular type of thermoplastic resin toner, in accordance with the speed of the apparatus, and in accordance with any other parameters which are known to one skilled in the art.

The molecular weight of the polymeric fluids containing chemically reactive functional groups must be sufficiently high so that the fluid is not too volatile. Optimal molecular weights are dependent upon the particular polymeric specie used as a release agent and upon the chemistry of the particular polymer. For example, carboxy substituted polyethylene having a molecular weight on the order of about 1,000 has been found satisfactory. Carboxy substituted organo-functional siloxanes having a molecular weight on the order of 5,000 have been found satisfactory with preferred molecular weights being about 10,000 to 15,000 and higher. If the molecular weight of the polymer fluid is too low, volatile materials which may be corrosive or which may be irritating, hazardous or offensive, may evolve. If the molecular weight of the polymeric material is too high, metering is poor and coating thickness is difficult to control, and polymeric fluid may become tacky to the thermoplastic resin toner. Thus, when polymeric materials are utilized to treat the surface of a fuser member in an electrostatic reproducing apparatus, the molecular weight of the release material should be chosen so that volatile materials are not evolved; and so that effective metering is provided. A suitable or optimum molecular weight can be selected without the necessity of undue experimentation by observing the behavior of the particular fluid during the test outlined above for determining the concentration of the functional groups needed in the fluid. Low molecular weight fractions can be removed from an otherwise suitable fluid to produce a suitable polymeric fluid containing chemically reactive functional groups and having a molecular weight within the optimal range.

The release failure of the polymeric fluid having chemically reactive functional groups is related to the splitting of the image when the toner is softened and becomes sufficiently sticky to adhere to the surface of the fuser roll which results in a partial or ghost image on the next sheet, producing what is referred to as an offset image. Therefore, the release property of the particular polymeric fluid applied to the fuser member surface is a function of the offset image, and the higher the temperature of the fuser member before hot offsetting occurs, the better the release properties of the particular fluid. Furthermore, the greater the fusing latitude, that is the temperature at which the thermoplastic resin toner begins to fuse up to the temperature at which hot offset occurs, is also a function of the release properties of the particular polymeric fluid containing chemically reactive functional groups. This fusing latitude, that is, the temperature range at which the fusing member can operate and including the temperature from which the thermoplastic resin toner begins to fuse up to the temperature where hot offset begins to occur, is also known as the fusing window of the fuser member. The fusing latitude is substantially improved when the polymeric fluids having chemically reactive functional groups are applied to the fuser member. Particular improvement in fusing latitude has been found when the functional groups are carboxy, hydroxy, epoxy, amino, isocyanate, thioether and mercapto.

One method of fusing the toner material to the substrate is a fuser assembly which comprises a heated roll structure including a hollow cylinder or core having a suitable heating element disposed in the hollow portion thereof which is coextensive with the cylinder. The heating element may comprise any suitable type of heater for elevating the surface temperature of the cylinder to operational temperatures which are generally from 250°–400° F., and for example, may be a quartz lamp. The cylinder must be fabricated from any suitable material capable of accomplishing the objects of the invention, that is, a material which not only will transfer heat to the surface to provide the temperature required for fusing the toner particles, but also a material having a surface which is capable of interacting with the polymeric release agent having functional groups to form a product which becomes an interfacial layer or barrier layer to toner intermediate the release layer and the surface of the bare fuser member to prevent toner particles from contacting the fuser surface.

Typical fuser member materials are anodized aluminum and alloys thereof, steel, stainless steel, nickel, and alloys thereof, nickel plated copper, copper, glass, zinc, cadmium, and the like and various combinations of the above. The cylinder may also be fabricated from any suitable material which is non-reactive with the release agents as long as the surface of the cylinder is coated with a material capable of accomplishing the objects of the present invention, especially one which is capable of interacting with the polymeric release fluid having functional groups. Surface temperature of the fuser member may be controlled by means known to those skilled in the art, for example, by means described in U.S. Pat. No. 3,327,096.

In general, the fuser assembly further comprises a backup member, such as a roll or belt structure which cooperates with the fuser roll structure to form a nip through which a copy paper or substrate passes such that toner images thereon contact the fuser roll structure. The backup member may comprise any suitable construction, for example, a steel cylinder on a rigid steel core having an elastomeric layer thereon, or it may be a suitable belt material which provides the necessary contact between the fuser member and the substrate carrying the developed latent image. The dimensions of the fuser member and backup member may be determined by one skilled in the art and generally are dictated by the requirements of the particular copying apparatus wherein the fuser assembly is employed, the dimensions being dependent upon the process speed and other parameters of the machine. Means may also be provided for applying a loading force in a conventional manner to the fuser assembly to create nip pressures on the order of about 15 to about 150 psi average.

The fuser member treated by the method of the present invention wherein at least one polymeric fluid capable of displacing electroscopic thermoplastic resin toner is applied to a fuser member surface, said polymeric fluid containing chemically reactive functional groups capable of interacting with the fuser member surface to form a thermally stable interfacial layer and being applied in an amount sufficient to cover the surface with at least a continuous, low surface energy film of the fluid to prevent the non-reactive thermoplastic resin toner from contacting the surface of the fuser member and to provide a surface which releases the thermoplastic resin toner heated by the fuser member, is illustrated in the fuser assembly shown in FIG. 1. In FIG. 1, the numeral 1 designates a fuser assembly comprising heated roll structure or solid substrate 2, backup roll 8 and sump 20. Heated roll structure or solid substrate 2 includes a hollow cylinder or core 4 having a suitable heating element 6 disposed in the hollow portion thereof which is coextensive with the cylinder.

Backup roll 8 cooperates with roll structure or solid substrate 2 to form a nip 10 through which a copy paper or substrate 12 passes such that toner images 14 thereon contact fuser roll or solid substrate 2. As shown in FIG. 1, the backup roll 8 has a rigid steel core 16 with an elastomer surface or layer 18 thereon.

Hollow cylinder or core 4 being fabricated of metal such as anodized aluminum, aluminum and alloys thereof, steel, nickel and alloys thereof, copper, and the like as described above or glass, has a surface made of relatively high surface energy materials, and consequently toner material 14 contacting such surfaces when they are heated, would readily wet the surface. Accordingly, there is provided in accordance with the embodiment of FIG. 1, sump 20 for containing a polymeric release agent 22 capable of displacing non-reactive electroscopic thermoplastic resin toner when said material is in a fluid state, said polymeric release material containing chemically reactive functional groups which are capable of interacting with the fuser member surface to form a thermally stable interfacial layer thereon when in the fluid state. The polymeric release material 22 may be a solid or liquid at room temperature, but it must be a fluid at operating temperatures having a relatively low viscosity at the operating temperatures of the fuser roll structure or solid substrate 2. Release material 22 in sump 20 must have built-in chemically reactive functional groups capable of interacting with the surface material 2 found on hollow cylinder or core 4. In preferred embodiments, the chemically reactive groups of polymeric release material 22 in sump 20 are carboxy, hydroxy, epoxy, amino, isocyanate, thioether, mercapto and combinations thereof. Examples of such release material 22 are polyorgano siloxanes having carboxylic functional groups, polyorgano siloxanes having amino functional groups, polyethylene having carboxy functional groups, polybutylene having carboxy functional groups, and in general organofunctional silicones and functional hydrocarbon polymers.

In the embodiment shown in FIG. 1 for applying the polymeric release material 22 to solid substrate 2, a metering blade 24 preferably of conventional non-swelling rubber is mounted to sump 20 by conventional means such that an edge 26 thereof contacts the solid substrate 2 of the fuser roll structure to serve as a metering means for applying the release material having chemically reactive groups 22 to the fuser roll in its liquid or fluid state. By using such a metering blade, a layer of polymeric release fluid 22 can be applied to surface or substrate 2 in controlled thicknesses ranging from submicron thicknesses to thicknesses of several microns of the release fluid. Thus, by metering device 24, 0.1–0.5 micron or greater thicknesses of release fluid can be applied to substrate 2. In the embodiment shown, a pair of end seals 28, for example, of sponge rubber, are provided to contain the release material 22 in sump 20. One or more stripper fingers 30 may be provided for insuring removal of the substrate 12 from substrate 2. In one of the preferred embodiments, the thermoplastic resin toner is fused to paper, however, thermoplastic resin toner may be fused to other substrates such as polymeric films by the fuser members and process of the present invention, the only limitation being that the polymeric fluids having chemically reactive functional groups must not adversely react with the substrate upon which the toner is used and must not destroy or alter the coloring properties of the thermoplastic resin toner.

The embodiment described above in FIG. 1 is merely one of the preferred means for applying a layer of polymeric release material containing chemically reactive functional groups capable of interacting with the fuser member surface to form a thermally stable interfacial barrier layer in an amount sufficient to cover the surface with at least a continuous, low surface energy film of the fluid to provide the fuser member with a surface which releases thermoplastic resin toner heated by the fuser member. Other means for applying the polymeric release fluid which is abhesive to electroscopic thermoplastic resin toner and having functional groups which interact with the solid substrate of the fuser member, comprise means which spray a layer of the release fluid upon the fuser surface, a pad or sponge-like material which pads a coating of the polymeric release fluid having chemically reactive functional groups on the surface of the user member, a wick which contacts the surface of the fuser member to provide a film of layer of the polymeric release material having chemically reactive functional groups, extruding means which extrude a minute film of the polymeric release material having chemically reactive functional groups on the fuser member, a brush having fibers or bristles comprised of the polymeric release material having chemically reactive functional groups or a brush or bristle having the polymeric release fluid having chemically reactive functional groups on the surfaces of the bristles or brush materials, fluid soaked rolls or wicks and the like.

Figure 2:
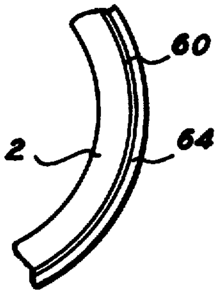
FIG. 2 is a fragmentary view of a fuser member of the present invention.

The fuser member for an electrostatic reproducing apparatus resulting from the method of treating the surface of a heated fuser member with at least one polymeric fluid capable of displacing electroscopic thermoplastic resin toner, is shown in FIG. 2. The fuser member shown in FIG. 2 is magnified many times over the member shown in FIG. 1 in order to show the thin layers on the fuser member surface. In FIG. 2, the heated roll structure or solid substrate is designated by numeral 2. A release layer of fluid is designated by numeral 64 and an interfacial layer is designated by numeral 60. Thus, there is described a fuser member having a solid substrate 2, a release layer of polymeric fluid 64 which is abhesive to electroscopic thermoplastic resin toner and having chemically reactive functional groups which interact with the solid substrate 2, and interfacial layer 60 which prevents the electroscopic thermoplastic resin toner (not shown) from contacting solid substrate 2, said interfacial layer 60 being formed by the interaction of solid substrate 2 and the chemically reactive functional groups of polymeric fluid release layer 64.

In one of the preferred embodiments, solid substrate 2 of FIG. 2, comprises a metal capable of forming oxides, and in more preferred embodiments, the solid substrate 2 may be selected from the group consisting of iron, copper, aluminum, titanium, zinc, silver, nickel and cadmium and oxide-forming alloys thereof. Solid substrate 2 may also be comprised of glass.

In accordance with the present invention, it has been unexpectedly observed that when solid substrate 2 in FIG. 2 is an oxide-containing or -forming material and the polymeric fluid 64 is the type having functional groups, and preferably functional groups selected from the group consisting of carboxy, hydroxy, epoxy, amino, isocyanate, thioether, mercapto, and combinations thereof, and electroscopic thermoplastic resin toner is applied thereto and softened, the electroscopic thermoplastic resin toner is displaced from solid substrate 2 by the action of polymeric fluid 64 applied thereto when release layer 64 and interfacial layer 60 are interrupted, and the surface of the substrate 2 is exposed to the toner. Interruptions in the release layer 64 and interfacial layer 60 may occur, for example, by scraping of the surface by the stripper finger, by a thermistor device to control the temperature at the surface, by other abrasive forces which scratch or deface the layers coated on solid substrate 2, and the like. Thus, when the non-reactive electropscopic thermoplastic resin toner is applied to the surface which has been interrupted by such forces, it was unexpectedly found that the non-reactive electroscopic thermoplastic resin toner is displaced from the solid substrate 2 by the action of the polymeric release layer material as it is applied to the fuser member. Although the details of this mechanism are not completely understood, it is believed that the polymeric release fluids having chemically reactive functional groups, actually compete with the electroscopic thermoplastic resin toner for the surface of substrate 2, and because the release material having the chemically reactive groups is more reactive toward the solid substrate surface 2 than is the electroscopic resin toner, the release material actually displaces the electroscopic thermoplastic resin toner from substrate 2 as it reforms interfacial layer 60 in the interrupted zone or portion of the surface by the interaction of the release material 64 and the surface 2. Thus, by using the electroscopic thermoplastic resin toners which have no functional groups thereon, the release layer fluids having functional groups thereon, are found to actually displace the electroscopic thermoplastic resin toner applied to and softened upon the surface of the fuser roll from any interruptions occuring therein, thereby preventing offsetting of the material and ghosting of the image.

In a preferred embodiment shown in FIG. 2 interfacial barrier layer 60 comprises a solid barrier between solid substrate 2 and release layer 64. One of the preferred classes of polymeric fluids abhesive to electroscopic thermoplastic resin toner and having built-in, chemically reactive functional groups which interact with solid substrate 2, comprises polymers of alkyl and dialkyl siloxanes having functional groups selected from the group consisting of carboxy, hydroxy, epoxy, amino, mercapto, isocyanate, thioether and combinations thereof. Other preferred polymeric fluid release materials abhesive to the electroscopic thermoplastic resin and having built-in, chemically reactive functional groups which interact with solid substrate 2 to cause the formation of barrier 60, comprise polymeric (homopolymers and copolymers) of saturated or unsaturated hydrocarbons or mixtures thereof having functional groups selected from the group consisting of carboxy, hydroxy, epoxy, amino, isocyanate, thioether, mercapto and combinations thereof. Examples of such polymeric entities include polyethylene, polypropylene, polyisobutylene and the like, acrylic acid and methacrylic acid copolymers of ethylene, propylene, isobutylene and the like.

The following examples further define, describe and compare exemplary materials for treating the surfaces of heated fuser members in an electrostatic reproducing apparatus with a polymeric fluid capable of displacing electroscopic thermoplastic resin toner, the fluid containing chemically reactive functional groups capable of interaction with the fuser member surface to form a thermally stable interfacial layer thereon. Parts and percentages are by weight unless otherwise indicated. Molecular weights are number average unless otherwise specified. The examples are also intended to illustrate the various preferred embodiments of the present invention. Unless otherwise specified the polymeric fluid containing chemically reactive functional groups was applied to the fuser member surface by the apparatus described above as illustrated in FIG. 1.

In determining the effectiveness of the polymeric fluids containing chemically reactive functional groups, an electrostatic latent image was formed on a conventional recording surface in a conventional electrostatic reproducing apparatus, and the electrostatic latent image was developed with a heat fusible toner comprising carbon black pigmented copolymer, styrene-n-butylmethacrylate, the toner particles being held on the recording surfaces in conformance with the electrostatic latent image. The toner image was thereafter transferred to plain paper. The paper having the toner images electrostatically adhered thereto, was then passed at a speed of about 15 inches per second between a fuser roll structure and a backup roll, the fuser roll structure being the type wherein temperature can be controlled as well as nip pressure. The toner image contacted a fuser roll structure which had a 2.0 inch outside diameter and which was 15 inches long. The backup roll had an outside diameter of about 2.0 inches with a 0.1 inch layer of silicone rubber covered with a 0.020 inch coating of fluorinated ethylene-propylene resin on the surface and having a durometer of 65 Shore A. The fuser roll structures were fabricated from metals having the finishes described in the examples set forth below. Release agents consisting of the materials described below were liquified and metered onto the fuser roll prior to contacting thereof by the toner image. Fusing latitude or fusing window was then determined.

EXAMPLE I

In the fuser fixture and apparatus described supra, using a copper fuser roll, a carboxy-functional polydimethyl siloxane having carboxy groups attached to propyl spacer groups with 1 mole percent carboxy functionality was applied to the copper fuser roll from the sump. A conventional toner comprising a copolymerized mixture of styrene and about 25 percent (by weight) propyl methacrylate ester having carbon black pigment (Xerox Corp. 364 Toner) was fused. Release of the toner from the coated copper fuser roll occurred up to 120° F. above minimum fuse temperature of about 280° F. The carboxy-functional polyorganofunctional siloxane used in this example had a molecular weight of about 7,500 and a viscosity of about 300 centipoise at ambient. The stability of the release agent was greater than two weeks at 400° F.

EXAMPLE II

A polyorganofunctional siloxane was used as in Example I to coat fuser rolls except the carboxy functionality was 2 mole percent. Copper, aluminum and stainless steel rolls were used as fuser members. The fusing latitude (window) for the copper roll was 280°-400° F. for the aluminum roll was 280°-420° F., and for the stainless steel roll was 280°-350° F., when used to fuse the toner of Example I.

EXAMPLE III

Application of a carboxy-functional polyorganofunctional silicone fluid having a 0.5 mole percent carboxy functionality and a molecular weight of 7,500 to a copper fuser roll provided release of the toner of Example I up to 80° F. above the minimum fuse temperature of 280° F.

EXAMPLE IV

A procedure for testing the release agent was similar to that of Example I except an amino-functional polydimethyl siloxane having amino ($-NH_2$) groups attached to propyl spacer groups with 2.5 functional amino groups per every 60 siloxane groups and having a room temperature viscosity of about 200 centipoise was applied as the release agent on a stainless steel fuser roll. The fusing latitude was 280°-300° F. when used with toner material similar to that of Example I, and the stability of the release agent was about 200 hours at 400° F.

EXAMPLE V

The procedure of Example I was used for testing the release properties of a hydroxy-functional polydimethyl siloxane release agent having hydroxy ($-OH$) groups attached to propyl spacer groups with three hydroxy groups per molecule functionality. The release agent having a molecular weight of about 3,000 and a viscosity of 450 centipoise at room temperature was applied to a fuser roll having a copper surface. The fusing latitude was 280°-300° F. when used with toner material similar to that of Example I.

EXAMPLE VI

Following the procedure of Example I, an epxoyfunctional polydimethyl siloxane having epoxy groups attached to propyl spacer groups with 1 mole percent epoxy functionality and a molecular weight of about 8,000 and an ambient viscosity of about 300 centipoise was applied to a copper fuser roll. The fusing latitude was 280°-290° F.

EXAMPLE VII

A carboxy-functional polydimethyl siloxane as in Example I was blended with polydimethyl siloxane (silicone oil) (50/50 blend) to provide a completely miscible fluid having 1 mole percent functionality. When applied to a copper fuser roll, the miscible blend had a fusing latitude of 280°-400° F. with the toner of Example I. The blend had excellent stability (greater than two weeks) at 400° F. and a viscosity about 225 centipoise at ambient. When used with an aluminum roll the fusing latitude was 280° to greater than 420° F., and when used with a stainless steel roll the fusing latitude was 280° to greater than 350° F.

EXAMPLE VIII

A miscible blend (4 parts polyorganofunctional siloxane to 1 part silicone oil) was prepared as in Example VII except the fluid had 0.2 mole percent carboxy functionality. The blend had fusing latitudes nearly the same as those described in Example VII above, excellent stability and a viscosity of about 200 centipoise at ambient.

EXAMPLE IX

The toner of Example I was fused on a bare copper roll and a bare stainless steel roll. Immediate release failure was observed in both cases at the minimum fue temperature of 280° F. as evidenced by offsetting on the roll.

EXAMPLE X

The toner of Example I was fused on both a copper and a stainless steel fuser roll coated with polydimethyl siloxane fluid (silicone oil). Immediate release failure was observed in both cases at the minimum fuse temperature of 280° F.

EXAMPLE XI

A copolymer of Polyethylene and acrylic acid having a viscosity of 500 cp at 140° C., an acid number of 40, and a molecular weight of about 4,000 was used as the release agent of Example I on a copper fuser roll. The fusing latitude was 280° to 390° F.

Blends of the above copolymer with polyethylene (Bareco 1000) having a molecular weight of about 1,000 were used as the release agent of Example I. When used in concentrations of between about 0.08 and 8.0 weight percent of the polyethylene coacrylic acid supplied by Allied Chemical Co. under the designation of AC 540, the release agents had a minimum fusing temperature of 280° F. and an upper fusing temperature of between 320° and 390° F. when used with the toner of Example I and a copper fuser roll.

The above copolymer release agents had excellent stability, i.e., they did not gel for a period greater than two weeks while maintained at 300° F.

In accordance with the stated objects there has been demonstrated a release agent, a fusing process and a fusing member for fixing toner images. In all cases it was observed that the fuser member is self-repairing, the surface being continuously renewable. In the above experiments with the release agents, it was also observed that toner is actually displaced fron exposed surfaces of fuser members having the poivmeric fluids with functional groups thereon coated upon the surface, by reason of the action of the release agents. Experiments as set forth in the above examples were conducted and surface areas were gouged so that toner material became lodged upon the copper, stainless steel and aluminum surfaces. In all cases the toner material was actively displaced from the surface of fuser members by the action of the release agent, and toner contamination of subsequent copies was avoided. This phenomenon was observed for both single component systems and multiple miscible component systems containing the functional polymeric fluids.

While the invention has been described with respect to preferred embodiments, it will be apparent that certain modifications and changes can be made without departing from the spirit and scope of the invention, and therefore, it is intended that the foregoing disclosure be limited only by the claims appended hereto.

What is claimed is:

1. A fuser member for an electrostatic reproducing apparatus comprising a heated, metal substrate; a release layer of polymeric fluid, abhesive to electroscopic thermoplastic resin toner of the type having no functional groups thereon, said polymeric fluid having built-in functional groups selected from the group consisting of hydroxy, epoxy, amino, isocyanate, mercapto and combinations thereof which interact with the metal substrate; and an interfacial layer which prevents the electroscopic thermoplastic resin toner from contacting the metal substrate, said interfacial layer formed by the interaction of said metal substrate and the built-in functional groups of the fluid, the polymeric fluid containing built-in functional groups remaining fluid on the surface at temperatures between about 250° F. and 400° F. said interfacial layer being located between the metal substrate and the release layer of polymeric fluid.

2. The fuser member of claim 1 wherein the metal substrate is a metal capable of forming oxides.

3. The fuser member of claim 1 wherein the metal is selected from the group consisting of iron, copper, aluminum, titanium, zinc, silver, nickel, and cadmium and oxide-forming alloys thereof.

4. The fuser member of claim 1 wherein the interfacial layer is insoluble in the fluid release layer.

5. The fuser member of claim 1 wherein the metal substrate is a metal capable of forming oxides and the release layer polymeric fluid is the type having built-in functional groups, and electroscopic thermoplastic resin toner of the type having no functional groups, applied thereon and softened is displaced from the metal substrate by the action of additional fluid having built-in functional groups applied thereto when the release layer and the interfacial layer are interrupted and the surface of the substrate is exposed to the toner.

6. The fuser member of claim 1 wherein the polymeric fluid abhesive to electroscopic thermoplastic resin toner and having built-in functional groups which interact with the metal substrate comprises dialkyl siloxane having built-in functional groups selected from the group consisting of hydroxy, epoxy, amino, mercapto, isocyanate and combinations thereof.

7. The fuser member of claim 1 wherein the polymeric fluid abhesive to the electroscopic thermoplastic resin toner and having built-in functional groups which interact with the metal substrate, comprises saturated or unsaturated hydrocarbons or mixtures thereof having built-in functional groups selected from the group consisting of hydroxy, epoxy, amino, isocyanate, mercapto and combinations thereof.

8. The fuser member of claim 7 wherein polymeric fluid is polyethylene having built-in functional groups.

9. The fuser member of claim 7 wherein the polymeric fluid is polypropylene having built-in functional groups.

10. The fuser member of claim 7 wherein the polymeric fluid is polyisobutylene having built-in functional groups.

11. The fuser member of claim 1 wherein the fluid is a solid or liquid at ambient temperature and a liquid at operating temperatures between about 250° F. and 400° F.

12. A release agent composition for application to a fuser member having a metal surface for fusing thermoplastic resin toners of the type having no functional groups thereon, in an electrostatic reproducing apparatus comprising a polymeric fluid capable of displacing the electroscopic thermoplastic resin toner, said fluid containing built-in functional groups selected from the group consisting of hydroxy, epoxy, amino, isocyanate, mercapto and combinations thereof and capable of interacting with the metal surface of the fuser member in said apparatus to provide an interfacial barrier layer to said toner and a low surface energy film to release said toner heated by the fuser member, the polymeric fluid containing built-in functional groups remaining fluid on the surface at temperatures between about 250° F. and 400° F.

13. The release agent of claim 12 wherein the surface energy of the polymeric fluid is less than that of the toner at operating temperatures.

14. The release agent of claim 12 wherein the polymeric fluid reacts with at least one of the metals selected from the group consisting of iron, copper, aluminum, titanium, zinc, silver, nickel and cadmium and oxide-forming alloys thereof.

15. The release agent of claim 12 wherein the polymeric fluid comprises at least about 0.2 built-in functional groups per molecule.

16. The release agent of claim 12 wherein the polymeric fluid comprises about 0.5 to about 10.0 built-in functional groups per molecule.

17. The release agent of claim 12 wherein the molecular weight of the polymeric fluid is at least about 1,000.

18. The release agent of claim 12 wherein the molecular weight of the polymeric fluid is about 10,000 to about 15,000.

19. The release agent of claim 12 wherein the viscosity of the polymeric fluid is higher than about 20 centipoise at 300° F.

20. The release agent of claim 12 wherein the built-in functional groups are substituted on an alkyl moiety of the polymer backbone of the polymeric fluid.

21. The release agent of claim 20 wherein the alkyl moiety is from about 1 to about 5 carbon atoms and mixtures thereof.

22. The release agent of claim 12 wherein the polymeric fluid is a dialkyl polysiloxane having built-in functional groups selected from the group consisting of hydroxy, epoxy, amino, isocyanate, mercapto and thioether.

23. The release agent of claim 12 wherein the polymeric fluid is polyethylene having built-in functional groups selected from the group consisting of hydroxy, epoxy, amino, isocyanate, mercapto and combinations thereof.

24. The release agent of claim 12 wherein the polymeric fluid is polypropylene having built-in functional groups selected from the group consisting of hydroxy, epoxy, amino, isocyanate, mercapto and combinations thereof.

25. The release agent of claim 12 wherein the polymeric fluid is polyisobutylene having built-in functional groups selected from the group consisting of hydroxy, epoxy, amino, isocyanate, mercapto and combinations thereof.

26. The release agent of claim 12 further comprising a blend of the polymeric fluid having built-in functional groups and at least one dilution agent which is miscible therewith.

27. The release agent of claim 26 wherein the dilution agent is polydimethyl siloxane.

* * * * *